United States Patent [19]

Topfl et al.

[11] 4,009,110
[45] Feb. 22, 1977

[54] COPOLYMERS OF MALEIC ANHYDRIDE, DIKETENE AND ALKYL ETHERS, PROCESS FOR THEIR MANUFACTURE AND THEIR USE

[75] Inventors: Rosemarie Topfl, Dornach; Richard Von Rutte, Riehen, both of Switzerland

[73] Assignee: Ciba-Geigy Corporation, Ardsley, N.Y.

[22] Filed: June 26, 1975

[21] Appl. No.: 590,544

[30] Foreign Application Priority Data

July 16, 1974 Switzerland .................. 9765/74

[52] U.S. Cl. .................. 252/8.9; 204/159.22; 252/89 R; 252/DIG. 3; 260/63 R
[51] Int. Cl.[2] .................. D06T 1/00; C08F 2/46; C08G 2/00; C08G 2/26
[58] Field of Search ............ 260/63 R; 252/8.9, 89, 252/DIG. 3; 204/159.22

[56] References Cited

UNITED STATES PATENTS

| | | | |
|---|---|---|---|
| 2,585,537 | 2/1952 | Coffman | 260/78.5 |
| 2,653,146 | 9/1953 | Gray et al. | 260/66 X |
| 3,153,019 | 10/1964 | Spes et al. | 260/63 R |
| 3,321,442 | 5/1967 | Beecken et al. | 260/63 R |
| 3,563,953 | 2/1971 | Lehmann et al. | 260/63 R |
| 3,630,920 | 12/1971 | Freifeld et al. | 252/DIG. 3 |
| 3,721,654 | 3/1973 | Schlumbom | 260/78.5 R |
| 3,764,559 | 10/1973 | Mizuno et al. | 252/89 |
| 3,776,850 | 12/1973 | Pearson et al. | 252/89 |

FOREIGN PATENTS OR APPLICATIONS 2,197,905 3/1974 France

*Primary Examiner* — Joseph L. Schofer
*Assistant Examiner* — Herbert J. Lilling
*Attorney, Agent, or Firm* — Joseph G. Kolodny; Edward McC. Roberts; Prabodh I. Almaula

[57] ABSTRACT

Copolymers obtained by polymerizing maleic anhydride, diketene and a vinyl alkyl ether, the alkyl moiety of which contains 1 to 22 carbon atoms, are provided. These copolymers or their partially or completely hydrolyzed derivatives can be used as surface active compounds, glass cleaners, additives to detergent builders or preferably as detergent builders and sequestering agents themselves.

9 Claims, No Drawings

COPOLYMERS OF MALEIC ANHYDRIDE, DIKETENE AND ALKYL ETHERS, PROCESS FOR THEIR MANUFACTURE AND THEIR USE

The invention provides copolymers which contain recurring units of the formulae

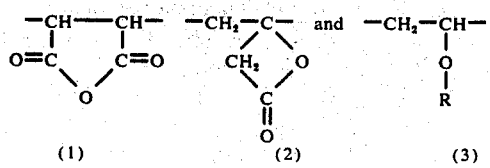

wherein R represents alkyl of 1 to 22 carbon atoms, each molecule containing on average together 6 to 300 units of the formulae (1), (2) and (3), and the ratio of the units of the formulae (1), (2) and (3) in the molecule is 1 : (0.7 to 0.9) : (0.3 to 0.1), and said copolymers can also be in at least partially hydrolysed form.

The hydrolysis products of the copolymers are at least partially hydrolysed copolymers in which either the maleic acid ring or both the maleic acid ring and the lactone ring are hydrolysed. The hydrolysis products can also be in the form of their salts, e.g. alkali metal, alkaline earth metal, amine or ammonium salts.

Preferred copolymers contain on average 6 to 150, especially 6 to 120, units of the formulae (1), (2) and (3) in each molecule.

The copolymers according to the invention normally have an average molecular weight of 600 to 15,000, preferably 600 to 10,000 or 600 to 5,000 or especially 600 to 2,000.

The copolymers form linear chains built of recurring units of the formulae (1), (2) and (3), the end members of these chains as a rule being saturated by hydrogen.

The radical of the formula (1) is derived from maleic anhydride, that of the formula (2) from diketen and that of the formula (3) from a vinyl alkyl ether. The alkyl radical R in the formula (3) contains 1 to 22, preferably 2 to 18 or especially 2 to 8, carbon atoms, and can be both branched and unbranched and is substituted or unsubstituted. Examples of such radicals are: methyl, ethyl, n-propyl, isopropyl, n-butyl, isobutyl, n-hexyl, 2-ethyl-hexyl, n-dodecyl, stearyl or behenyl. Examples of possible substituents are halogen atoms, especially chlorine or bromine. The n-butyl radical has proved particularly advantageous. The chloroethyl radical may be cited as an example of the substituted radicals.

The copolymers according to the invention are manufactured by polymerising maleic anhydride, diketene and a vinyl alkyl ether the alkyl moiety of which contains 1 to 22 carbon atoms, in an organic solvent which is inert to the reactants and in the presence of radical initiators or under the influence of electromagnetic waves at temperatures of −20° to +100° C and by optionally hydrolysing the resultant copolymer.

The polymerisation is therefore carried out under radical conditions, suitable radical initiators being e.g. $\alpha,\alpha'$-azobisisobutyronitrile or peroxides, for example benzoyl peroxide, or under the influence of electromagnetic waves, i.e. of irradiation, for example with ultraviolet light. When using radical initiators, the reaction temperatures are preferably in the range of 40° to 80° C, and in the case of irradiation, the preferred temperature range is from −20° to +80° C. The copolymerisation is also preferably carried out excluding oxygen, especially in vacuo or in a nitrogen atmosphere.

Substantially every solvent that is inert to maleic anhydride, diketene and the vinyl alkyl ether can be used for the process according to the invention. Examples of such solvents are: halogenated lower hydrocarbons of 1 to 4, preferably of 1 or 2, carbon atoms, cyclic low molecular ethers, and low molecular ketones, benzene and substituted benzenes.

Specific examples of particularly suitable solvents are: acetone, dioxan, tetrahydrofuran, benzene, methylene chloride, chloroform, 1,2-dichloroethane, perchloroethylene and mixtures thereof.

The rate of polymerisation differs according to the solvent used. The polymer yield increases linearly with the reaction time. But the degree of the reaction depends on the nature and concentration of the solvent used and on the composition and concentration of the monomers.

The maleic anhydride/diketene/vinyl alkyl ether copolymers usually have an alternating structure and the ratio between maleic anhydride and the two other components together is as a rule 1:1.

The polymers according to the invention are normally obtained in the form of white powders; but they can also be slightly yellow or brown in colour. They are soluble for example in dimethyl formamide, acetone, acetic anhydride and methanol, partially soluble in tetrahydrofuran, but are virtually insoluble in benzene, toluene, chloroform, dioxan, halogenated benzenes and cyclohexane.

The viscosity numbers of the polymers ($\mu$, intrinsic viscosity), measured in acetone at 25° C, are in the range of approximately 0.06 to 0.4 or 0.06 to 0.25, preferably 0.08 to 0.35 or 0.08 to 0.25.

The copolymers according to the invention can be used in different fields of application. For example, water-soluble products in which substantially only the anhydride group is hydrolysed, are obtained by treating the copolymers with hot water; the lactone group is subsequently also hydrolysed, if appropriate by using alkali hydroxide solutions.

The maleic anhydride, diketene and the vinyl alkyl ethers used as starting materials for the copolymerisation are readily obtainable and in part industrial products.

The copolymers, or the at least partially or completely hydrolysed copolymers, can be used e.g. as surface active compounds, as glass cleaners or above all in solid and liquid synthetic detergents, e.g. as additives for builders or as builders themselves. Completely hydrolysed copolymers can be obtained for example by taking up about 20 g of polymer in 80 ml of water and heating the solution to about 80° C with stirring. The polymer dissolves after a short time to give clear solutions with pH values of about 1.4 to 1.6.

The detergent power of detergents and cleansing agents is known to be substantially increased by the addition of builders. Normally sodium tripolyphosphate is used as builder in this connection. However, the disadvantage of these polyphosphates is that, when used in higher concentrations, they effect eutrophication in stagnant waters.

The copolymers according to the invention are highly effective builders which do not contain phosphorus and nitrogen and furthermore possess in addition surface-active properties. Because of this surface activity they are able to increase the detergent power of detergents.

The copolymers according to the invention can be combined as builders with all customary constituents of detergents and cleaning products. Numbered among these are in particular anionic, amphoteric or non-ionic surfactants; weakly acid, neutral or alkaline inorganic or organic salts, e.g. ($Na_2SO_4$, NaCl), especially inorganic or organic complexing agents; and water. Examples of other assistants are foam regulators, enzymes, soil suspenders, softeners, bleaching agents, such as perborates and percarbonates and their activators like tetraacetylethylenediamine or tetraacetyl glycol uryl, antimicrobic agents, colourants and aromatic substances, fluorescent brighteners as well as basic additives, such as silicates. The builders according to the invention can of course also be used in admixture with conventional builders and it is also preferred to so use them.

Suitable detergent base materials for the detergents according to the invention are anionic surfactants of the sulphonate or sulphate type, for example alkylbenzenesulphonates, in particular n-dodecylbenzenesulphonate, also olefin sulphonates such as those obtained by sulphonation of primary or secondary aliphatic monoolefins with gaseous sulphur trioxide and subsequent alkaline or acid hydrolysis, and alkylsulphonates such as those obtained from n-alkanes by sulphochlorination or sulphoxidation and subsequent hydrolysis or neutralisation or by addition of bisulphite to olefins. Also suitable are $\alpha$-sulpho-fatty acid esters, primary and secondary alkylsulphates and the sulphates of higher molecular weight alcohols.

Further compounds of this class which can be present in the detergents are the higher molecular weight sulphated partial ethers and esters of polyhydric alcohols, such as the alkali salts or monoalkyl ethers or the mono-fatty acid ester of glycerol monosulphuric acid ester or of 1,2-dioxypropanesulphonic acid. Sulphates of ethoxylated or propoxylated fatty acid amides and alkylphenols as well as fatty acid taurides are also suitable.

Further suitable anionic detergent base materials are alkali soaps of fatty acids of natural or synthetic origin, e.g. the sodium soaps of coconut, palm nut or tallow fatty acids. Suitable zwitterionic detergent base materials are alkylbetaines and especially alkylsulphobetaines, e.g. 3-(N,N-dimethyl-N-alkylammonium)-propane-1-sulphonate and 3-(N,N-dimethyl-N-alkylammonium)-2-hydroxypropane-sulphonate.

The anionic detergent base materials can be in the form of the sodium, potassium and ammonium salts and of the salts of organic bases, such as mono-, di- and triethanolamine. If the cited anionic and zwitterionic compounds possess and aliphatic hydrocarbon radical, this radical is preferably straight-chain and contains 8 to 22 carbon atoms. In the compounds with an aralipatic hydrocarbon radical, the preferably unbranched alkyl chains contain on average 6 to 16 carbon atoms.

Suitable non-ionic, wash-active surfactants are primarily polyglycol ether derivatives of alcohols, fatty acids and alkylphenols which contain 3 to 30 glycol ether groups and 8 to 20 carbon atoms in the hydrocarbon radical. Particularly suitable polyglycol derivatives are those in which the number of ethylene glycol ether groups is 5 to 25 and the hydrocarbon radicals of which are derived from staight-chain primary alcohols of 12 to 18 carbon atoms or from alkylphenols with a straight alkyl chain of 6 to 14 carbon atoms. Detergents with a particularly low foaming power are obtained by addition of 3 to 25 moles of propylene oxide to the last mentioned polyethylene glycol ethers or by converting these latter into the acetals.

Further suitable non-ionic detergent base materials are the water-soluble polyethylene oxide adducts of polypropylene glycol, ethylenediaminopolypropylene glycol and alkylpolypropylene glycol with 1 to 10 carbon atoms in the alkyl chain, said adducts containing 20 to 250 ethylene glycol ether groups and 10 to 100 propylene glycol ether groups. The cited compounds normally contain 1 to 5 ethylene glycol units per propylene glycol unit. It is also possible to use non-ionic compounds of the type of the amino oxides and sulphoxides, which can also optionally be ethoxylated.

The composition of conventional solid detergents which also contain the copolymers according to the invention is as follows:

1 to 60, preferably 5 to 30, in particular 10 to 25, parts by weight of a surfactant, 65 to 1, preferably 50 to 2, percent by weight of a builder which in turn contains 10 to 100, in particular 20 to 30, percent by weight of the copolymers, and 0 to 75 percent by weight of other detergent consituents, e.g.

5 to 75% of inorganic salts such as NaCl, $Na_2SO_4$, $Na_2CO_3$ 1 to 3% of additives, such as soil suspenders (e.g. carboxymethyl cellulose), aromatic substances etc., 0.05 to 0.8% of fluorescent brightener.

Liquid detergents and cleansing products contain preferably 5 to 25 percent by weight of a surfactant and 50 to 1 percent by weight of a builder in the given composition for the solid products in addition to water and optionally other available assistants.

Suitable builders with which the copolymers according to the invention can be combined are inorganic or organic salts which give weakly acid, neutral and alkaline reaction, especially inorganic or organic complexing agents.

Salts which give weakly acid, neutral or alkaline reaction are, for example, the bicarbonates, carbonates, borates or silicates of alkalies, further mono-, di- or trialkaliorthophosphates, di- or tetraalkalipyrosphates, metaphosphates known as complexing agents, alkali sulphates and the alkali salts or organic, capillary inactive sulphonic, carboxylic and sulphocarboxylic acids which contain 1 to 8 carbon atoms. To these belong, for example, water-soluble salts of benzenesulphonic, toluenesulphonic or xylenesulphonic acid, water-soluble salts of sulphoacetic acid, sulphobenzoic acids or salts of sulphodicarboxylic acids as well as the salts of acetic acid, lactic acid, citric acid and tartaric acid.

The water-soluble salts of higher molecular weight polycarboxylic acids are also useful as combinable builders, especially polymers of maleic acid, itaconic acid, mesaconic acid, fumaric acid, aconitic acid, methylenemalonic acid and citraconic acid. Copolymers of these acids with each other or with other polymerisable substances, e.g. with ethylene, propylene, acrylic acid, methacrylic acid, crotonic acid, 3-butenecarboxylic acid, 3-methyl-3-butenecarboxylic acid as well as vinyl methyl ether, vinyl acetate, isobutylene, acrylic amide and styrene are also possible.

The metaphosphates which give weakly acid reaction as well as the polyphosphates of alkaline reaction, especially the tripolyphosphate, are also suitable combinable complex forming builders.

The organic complexing agents comprise, for example, nitrilotriacetic acid, ethylenediaminetetraacetic acid, N-hydroxyethyl-ethylenediaminetriacetic acid, polyalkalenepolyamine-N-polycarboxylic acids and other known organic complexing agents, it being also possible to use combinations of different complexing agents. The other known complexing agents also comprise diphosphonic and polyphosphonic acids, e.g. methylenediphosphonic acid, 1-hydroxyethane-1,1-diphosphonic acid, 1-aminoethane-1,1-diphosphonic acid, amino-tri-(methylenephosphonic acid), methylamino- or ethylamino-di-methylenephosphonic acid and ethylenediamine-tetra-(methylenephosphonic acid). All these complexing agents can be in the form of free acids or preferably of alkali salts.

By replacing for example only 25% of the conventional sodium tripolyphosphate by copolymer, it is possible to reduce the total builder concentration in a detergent by more than threefold with the copolymers according to the invention.

Besides the ecological advantages, the low builder concentration has in addition the advantage above all that the soil deposition on the treated (washed) textile materials, e.g. woven fabrics, is greatly reduced.

A further advantage of the copolymers according to the invention resides in the increased ability to sequester calcium (lowering calcium induced hardness of water). The corrosiveness (dissolving of metals, e.g. zinc, copper or iron) of detergents which contain the copolymers according to the invention is not increased.

In the following Examples which illustrate the invention the percentages are by weight.

EXAMPLE 1

Copolymer of 1 mole of maleic anhydride/0.9 mole of diketene/0.1 mole of n-butyl vinyl ether 98 g of maleic anhydride (1 mole) are dissolved by being gently heated in 183.6 g of 1,2-dichloroethane. Then 75.6 g (0.9 mole) of diketene and 10 g (0.1 mole) of n-butyl vinyl ether are added and the resultant solution is poured into an agitator flask which has been scavenged with nitrogen. The solution is heated to an internal temperature of 60° C, than 0.5 g of $\alpha,\alpha'$-azo-bis-isobutyronitrile (catalyst) is added. The previously clear solution becomes turbid 7 minutes later and the copolymer begins to fall out. One hour afterwards 0.1 g of catalyst is added and the internal temperature is raised after a further hour to 75° C and at the same time 0.1 g of catalyst is again added. After a further hour the reaction mixture becomes very viscous and it is diluted with 200 g of 1,2-dichloroethane which has been heated to 80° C. Then 0.1 g of catalyst is again added. This addition of catalyst is repeated at hourly intervals 18 times. Total amount of catalyst: 2.5 g.

On termination of the addition of catalyst, polymerisation is continued for 2 hours. The precipitates copolymer is filtered with suction, washed with 1,2-dichloroethane, and dried.

Polymer: 153 g (= 83.3% of theory)
Molecular weight (vapour pressure osmosis): 1400
Viscosity number ($\mu$) : 0.14 in acetone at 25° C.

EXAMPLE 2

Copolymer of 1 mole of maleic anhydride/0.8 mole of diketene/0.2 mole of n-butyl vinyl ether 45 g (0.5 mole) of maleic anhydride are dissolved by being gently heated in 300 g of 1,2-dichloroethane. Then 33.6 g (0.4 mole) of diketene and 10 g (0.1 mole) of n-butyl vinyl ether are added and the solution is poured into an agitator flask which has been scaved with nitrogen. The solution is heated to an internal temperature of 75° C and then 0.5 g of $\alpha,\alpha'$-azo-bis-isobutyronitrile (catalyst) is added. The previously clear solution becomes turbid 2 minutes later and the polymer begins to fall out. Two hours later 0.25 g of catalyst is added and this addition is repeated at two-hourly intervals 7 times. Total amount of catalyst: 2.5 g.

Polymerisation is carried out for a further 2 hours upon termination of the addition of catalyst. The precipitated polymer is filtered off with suction, washed with 1,2-dichloroethane, and dried.

Polymer yield: 78 g (84.2% of theory)
Molecular weight (vapour pressure osmosis): 1200
Viscosity number ($\eta$): 0.20 in acetone at 25° C.

EXAMPLE 3

Copolymer of 1 mole of maleic anhydride/0.7 mole of diketene/0.3 mole of n-butyl vinyl ether 49 g (0.5 mole) of maleic anhydride are dissolved by being gently heated in 300 g of 1,2-dichloroethane. Then 29.4 g (0.35 mole) of diketene and 15 g (0.15 mole) of n-butyl vinyl ether are added and the solution is poured into an agitator flask which has been scavenged with nitrogen. The solution is heated to an internal temperature of 75° C and then 0.5 g of $\alpha,\alpha'$-azo-bis-isobutyronitrile (catalyst) is added. The previously clear solution becomes turbid after 1 minute. Then 0.25 g of catalyst is added 2 hours later and this addition is repeated at two-hourly intervals a further 7 times. Total amount of catalyst: 2.5 g.

Polymerisation is continued for 2 hours after all the catalyst has been added.

The precipitated polymer is filtered off with suction, washed with 1,2-dichloroethane and dried.

Polymer yield: 88 g (94.3% of theory)
Molecular weight (vapour pressure osmosis): 4200
Viscosity number ($\eta$): 0.34 in acetone at 25° C.

EXAMPLE 4

Copolymer of 1 mole of maleic anhydride/0.9 mole of diketene/ 0.1 mole of isobutyl vinyl ether 98 g (1 mole) of maleic anhydride are dissolved by being gently heated in 380 g of 1,2-dichloroethane. Then 75.6 g (0.9 mole) of diketene and 10 g (0.1 mole) of isobutyl vinyl ether are added and the solution is poured into an agitator flask which has been scavenged with nitrogen. The solution is heated to an internal temperature of 75° C and then 1 g of $\alpha,\alpha'$-azo-bis-isobutyronitrile (catalyst) is added. The previously clear solution becomes turbid after 1 minute and the polymer begins to precipitate. Then 0.5 g of catalyst is added 2 hours later and this addition is repeated at two-hourly intervals a further 7 times. Total amount of catalyst: 5 g.

Polymer: 168 g (91.5% of theory)
Molecular weight (vapour pressure osmosis): 2000

Viscosity number ($\eta$): 0.9 in acetone at 25° C.

EXAMPLE 5

Copolymer of 1 mole of maleic anhydride/0.9 mole of diketene/0.1 mole of 2-ethylhexyl vinyl ether 49 g (0.5 mole) of maleic anhydride are dissolved by being gently heated in 200 g of 1,2-dichloroethane. Then 37.8 g (0.45 mole) of diketene and 7.8 g (0.05 mole) of 2-ethylhexyl vinyl ether are added and the solution is poured into an agitator flask which has been scavenged with nitrogen. The solution is heated to an internal temperature of 75° C and then 0.5 g of $\alpha,\alpha'$-azo-bis-isobutyronitrile (catalyst) is added. The previously clear solution becomes turbid after 6 minutes and the polymer begins to precipitate. Then 0.25 g of catalyst is added after 2 hours and this addition is repeated at two-hourly intervals a further 7 times. Total amount of catalyst: 2.5 g.

Polymerisation is continued for 2 hours after all the catalyst has been added.

The precipitated polymer is filtered off with suction, washed with 1,2-dichloroethane and dried.

Polymer yield: 83.5 g (88% of theory)
Molecular weight (vapour pressure osmosis): 2575
Viscosity number ($\eta$): 0.14 in acetone at 25° C.

EXAMPLE 6

Copolymer of 1 mole of maleic anhydride/0.9 mole of diketene/0.1 mole of chloroethyl vinyl ether 49 g (0.5 mole) of maleic anhydride are dissolved by being gently heated in 200 g of 1,2-dichloroethane. Then 37.8 g (0.45 mole) of diketene and 5.3 g (0.05 mole) of chloroethyl vinyl ether are added and the solution is poured into an agitator flask which has been scavenged with nitrogen. The solution is heated to an internal temperature of 75° C and then 0.5 g of $\alpha,\alpha'$-azo-bis-isobutyronitrile (catalyst) is added. The previously clear solution becomes turbid after 1 minute and the polymer begins to precipitate. Then 0.25 g of catalyst is added 2 hours later and this addition is repeated at two-hourly intervals a further 7 times. Total amount of catalyst: 2,5 g.

Polymerisation is continued for a further 2 hours after all the catalyst has been added. The precipitated polymer is filtered off with suction, washed and dried.

Polymer yield: 85.7 g (93.2% of theory)
Molecular weight (vapour pressure): 2250
Viscosity number ($\eta$): 0.12 in acetone at 25° C.

EXAMPLE 7

Copolymer of 1 mole of maleic anhydride/0.9 mole of diketene/0.1 mole of stearyl vinyl ether 49 g (0.5 mole) of maleic anhydride are dissolved by being gently heated in 500 g of 1,2-dichloroethane. Then 37.8 g (0.45 mole) of diketene and 14.8 g (0.05 mole) of stearyl vinyl ether are added and the solution is poured into an agitator flask which has been scavenged with nitrogen. The solution is heated to an internal temperature of 75° C and then 0.5 g of $\alpha,\alpha'$-azo-bis-isobutyronitrile (catalyst) is added. A further 0.5 g of catalyst is then added after 20 minutes. The solution becomes distinctly more viscous and turbid after a further 20 minutes and 15 minutes later it is necessary to dilute the reaction mixture with 100 g of 1,2-dichloroethane. The solvent has been heated beforehand to 75° C. Two and a half hours after the first addition of catalyst, 0.25 g of catalyst is added and this addition is repeated at two-hourly intervals a further 4 times. Total amount of catalyst: 2.25 g. Polymerisation is continued for 2 hours after all the catalyst has been added. The product is diluted once more with 200 g of 1,2-dichloroethane, filtered off with suction, washed with 1,2-dichlorethane and dried.

Polymer yield: 92.4 g (90.8% of theory)
Molecular weight (vapour pressure osmosis): 1800
Viscosity number ($\eta$): 0.16 in acetone at 25° C.

Table I indicates the surface tensions (in dyn/cm$^2$) of the copolymers of Examples 1 to 7 in 3 different concentrations and at 2 different pH values. The surface tension of all copolymers is greater at pH 7 than at pH 1.2. (As comparison: water has a surface tension of about 72 dyn/cm$^2$).

Table 1

| Example | pH = 1.2 | | | pH = 7.0 | | |
|---|---|---|---|---|---|---|
| | 5,0 % | 2,0 % | 0,2 % | 5,0% | 2,0 % | 0,2 % |
| 1 | 36,5 | 37,8 | 46,4 | 45,2 | 49,0 | 61,4 |
| 2 | 38,5 | 40,1 | 47,3 | 50,5 | 54,4 | 67,7 |
| 3 | 38,7 | 40,1 | 48,7 | 54,4 | 57,8 | 67,0 |
| 4 | 35,7 | 37,1 | 50,8 | 42,0 | 47,8 | 61,4 |
| 5 | 35,9 | 37,7 | 42,3 | 39,4 | 41,1 | 59,6 |
| 6 | 54,0 | 55,0 | 61,5 | 54,9 | 62,4 | 68,0 |
| 7 | 54,9 | 55,8 | 59,1 | 62,7 | 63,1 | 68,5 |
| reaction product of maleic anhydride/ diketene (comparison product) | 60,0 | 61,5 | 65,0 | 52,4 | 58,5 | 67,8 |

EXAMPLE 8

The copolymer of Example 1 is tested in the following detergent systems and compared with systems which contain other or no copolymers:

Table II

| Constituents | Percentages by weight | | | | | |
|---|---|---|---|---|---|---|
| | A | B | C | D | E | F |
| Copolymer of Example 1 | 1,9 | 3,8 | 7,5 | — | — | — |
| diketene/maleic anhydride copolymer (comparison product) | — | — | — | 1,9 | 3,8 | 5,6 |
| sodium tripolyphosphate | 5,6 | 11,2 | 22,5 | 5,6 | 11,2 | 24,4 |
| condensation product of 1 mole of an industrial fatty alcohol mixture ($C_{16}$–$C_{18}$) and 25 moles of ethylene oxide (non-ionic) | 15 | 15 | 15 | 15 | 15 | 15 |

Table II-continued

| Constituents | Percentages by weight | | | | | |
|---|---|---|---|---|---|---|
| | A | B | C | D | E | F |
| carboxymethyl cellulose | 1 | 1 | 1 | 1 | 1 | 1 |
| sodium disilicate | 10 | 10 | 10 | 10 | 10 | 10 |
| sodium sulphate | 61,5 | 54 | 39 | 61,5 | 54 | 39 |
| water | 5 | 5 | 5 | 5 | 5 | 5 |
| builder (total concentration) | 7,5 | 15 | 30 | 7,5 | 15 | 30 |
| Δ Y | 38,7 | 41 | 42,3 | 35,1 | 35,2 | 39,5 |

Table III

| Constituents | Percentages by weight | | | | | | | | |
|---|---|---|---|---|---|---|---|---|---|
| | G | H | I | K | L | M | N | O | P |
| sodium salt of vinyl methyl ether/maleic anhydride copolymer (comparison product) | — | — | — | 1,9 | 3,8 | 7,5 | — | — | — |
| diketene/maleic anhydride copolymer (comparison product) | — | — | — | — | — | — | 1,9 | 3,8 | 7,5 |
| sodium tripolyphosphate | 7,5 | 15 | 30 | 5,6 | 11,2 | 22,5 | 5,6 | 11,2 | 22,5 |
| condensation product of 1 mole of an industrial fatty alcohol mixture ($C_{16}$–$C_{18}$) and 25 moles of ethylene oxide (non-ionic) | 15 | 15 | 15 | 15 | 15 | 15 | 15 | 15 | 15 |
| carboxymethyl cellulose | 1 | 1 | 1 | 1 | 1 | 1 | 1 | 1 | 1 |
| sodium disilicate | 10 | 10 | 10 | 10 | 10 | 10 | 10 | 10 | 10 |
| sodium sulphate | 61,5 | 54 | 39 | 61,5 | 54 | 39 | 61,5 | 54 | 39 |
| water | 5 | 5 | 5 | 5 | 5 | 5 | 5 | 5 | 5 |
| builder (total concentration) | 7,5 | 15,6 | 30 | 7,5 | 15 | 30 | 7,5 | 15 | 30 |
| Δ Y | 34,3 | 36,6 | 39,2 | 34,8 | 39,7 | 41 | 32,6 | 37,8 | 38,6 |

These detergents were compared by using the following wash text method:

An artificially stained test strip of cotton (EMPA cotton No. 101) and a clean cotton strip which has not been optically brightened are washed at 55° C for 10 minutes with 4 g/l of detergent and afterwards rinsed hot for 3 minutes (pH of the liquor: 10; liquor ratio: 1:60; water hardness: 15° C German hardness).

The brightness of the artificially stained fabric is evaluated by means of a reflectometer before and after washing and the differential values (Δ Y) is indicated as a function of the total builder concentration. The higher the Δ Y values are, the greater the brightness is. The human eye can distinguish Δ Y values of 0.2 or greater than 0.2 (in the case of dark shades) and 0.5 or greater than 0.5 (in the case of bright shades). This illustration of the detergent power shows that by replacing 25% of the sodium tripolyphosphate concentration by copolymer (e.g. total builder concentration 7.5%; copolymer: 1.9%) in such a detergent it is possible to reduce the total builder concentration by more than three-fold. If, for example, A and I are compared in Tables II and III, then 7.5% and 30% of builder in the detergent are required to attain the Δ Y values of 38.7 and 39.2 respectively. The vinyl methyl ether and diketene/maleic anhydride copolymers (Table II) are only as effective as the copolymer of the invention if the builder concentration is about two to four times higher (comparison of A with L and P):

| detergent | A | L | P |
|---|---|---|---|
| ΔY | 38.7 | 39.7 | 38.6 |
| builder concentration (in %) | 7.5 | 15 | 30 |

EXAMPLE 9

The copolymer of Example 1 is tested in the following detergent systems, and, in the same way as in Example 8, compared with systems which contain sodium tripolyphosphate or the sodium salt of a copolymer of vinyl methyl ether and maleic anhydride as builder. The results are reported in Table IV:

Table IV

| Constituents | Percentages by weight | | | | | | | | |
|---|---|---|---|---|---|---|---|---|---|
| | A | B | C | D | E | F | G | H | I |
| copolymer of Example 1 | 7,5 | 15 | 30 | — | — | — | — | — | — |
| sodium tripolyphosphate | — | — | — | 7,5 | 15 | 30 | — | — | — |
| sodium salt of the vinyl methyl ether/maleic anhydride copolymer (comparison product) | — | — | — | — | — | — | 7,5 | 15 | 30 |
| fatty alcohol sulphate of $C_{16}$–$C_{18}$ (anionic) | 15 | 15 | 15 | 15 | 15 | 15 | 15 | 15 | 15 |
| carboxymethyl cellulose | 1 | 1 | 1 | 1 | 1 | 1 | 1 | 1 | 1 |
| sodium disilicate | 10 | 10 | 10 | 10 | 10 | 10 | 10 | 10 | 10 |
| sodium sulphate | 60,5 | 53 | 38 | 60,5 | 53 | 38 | 60,5 | 53 | 38 |
| water | 6 | 6 | 6 | 6 | 6 | 6 | 6 | 6 | 6 |
| builder (total concentration) | 7,5 | 15 | 30 | 7,5 | 15 | 30 | 7,5 | 15 | 30 |
| Δ Y | 34,6 | 36,5 | 37,8 | 31,3 | 32,5 | 37,8 | 34,2 | 35,3 | 36,5 |

This illustration of the detergent power shows that more than double the concentration of sodium tripolyphosphate (comparison of A with E) and double the concentration of the vinyl methyl ether maleic anhydride copolymer (comparison of B with I) have only approximately the same effect as the simple concentration (7.5%) of the copolymer according to the invention.

Similarly good results are also obtained with the copolymers of Examples 2 to 7.

EXAMPLE 10

The copolymer of Example 5 is tested in the following detergent systems and, as in Example 8, compared with systems which contain sodium tripolyphosphate or the sodium salt of a copolymer of vinyl methyl ether and maleic anhydride as builder. The results are reported in Table V:

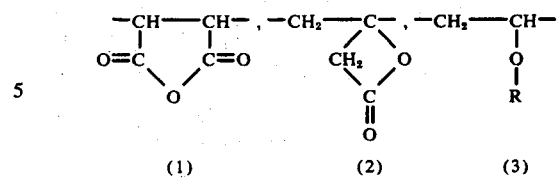

Table V

| Constituents | Percentages by weight | | | | | | | | |
|---|---|---|---|---|---|---|---|---|---|
| | A | B | C | D | E | F | G | H | I |
| copolymer of Example 5 | 7,5 | 15 | 30 | — | — | — | — | — | — |
| sodium tripolyphosphate | — | — | — | 7,5 | 15 | 30 | — | — | — |
| sodium salt of the vinyl methyl ether/maleic anhydride copolymer (comparison product) | — | — | — | — | — | — | 7,5 | 15 | 30 |
| dodecylbenzenesulphonate (anionic) | 15 | 15 | 15 | 15 | 15 | 15 | 15 | 15 | 15 |
| carboxymethyl cellulose | 1 | 1 | 1 | 1 | 1 | 1 | 1 | 1 | 1 |
| sodium disilicate | 10 | 10 | 10 | 10 | 10 | 10 | 10 | 10 | 10 |
| sodium sulphate | 66,5 | 59 | 44 | 66,5 | 59 | 44 | 66,5 | 59 | 44 |
| builder (total concentration) | 7,5 | 15 | 30 | 7,5 | 15 | 30 | 7,5 | 15 | 30 |
| Δ Y | 45,9 | 46,8 | 46,3 | 34,3 | 35,4 | 36,0 | 33,2 | 37,6 | 37,1 |

The Δ Y values show that the detergent power of a detergent containing the copolymer (builder) of Example 5 (detergents A, B and C) is very much greater even in low concentrations than that of detergents which contain sodium tripolyphosphate or a vinyl methyl ether/maleic anhydride copolymer as builder.

EXAMPLE 11

The copolymers of Examples 2, 4 and 6 are tested in the following detergent systems as in Example 10. The Δ Y values indicate the good detergent power of detergent systems which contain the copolymers according to the invention (phosphate substitute). Comparative figures for detergent systems which contain sodium tripolyphosphate can be inferred from Table V.

Table VI

| Constituents | Percentages by weight | | | | | | | | |
|---|---|---|---|---|---|---|---|---|---|
| | A | B | C | D | E | F | G | H | I |
| copolymer of Example 2 | 7,5 | 15 | 30 | — | — | — | — | — | — |
| copolymer of Example 4 | — | — | — | 7,5 | 15 | 30 | — | — | — |
| copolymer of Example 6 | — | — | — | — | — | — | 7,5 | 15 | 30 |
| dodecylbenzenesulphonate (anionic) | 15 | 15 | 15 | 15 | 15 | 15 | 15 | 15 | 15 |
| carboxymethyl cellulose | 1 | 1 | 1 | 1 | 1 | 1 | 1 | 1 | 1 |
| sodium disilicate | 10 | 10 | 10 | 10 | 10 | 10 | 10 | 10 | 10 |
| sodium sulphate | 66,5 | 59 | 44 | 66,5 | 59 | 44 | 66,5 | 59 | 44 |
| builder (total concentration) | 7,5 | 15 | 30 | 7,5 | 15 | 30 | 7,5 | 15 | 30 |
| Δ Y | 41,0 | 42,3 | 41,6 | 40,6 | 41,7 | 41,1 | 39,6 | 39,6 | 42,3 |

We claim:

1. Copolymers which contain recurring units of the formulae wherein R represents alkyl of 1 to 22 carbon atoms, each molecule containing on average together 6 to 300 units of the formulae (1), (2) and (3) and the ratio of the units of the formulae (1), (2) and (3) in the molecule is 1: (0.7 to 0.9): (0.3 to 0.1), or the hydrolysis products thereof, which are obtained by polymerisation of maleic anhydride, diketene and a vinyl alkyl ether the alkyl moiety of which contains 1 to 22 carbon atoms, in an organic solvent which is inert to the reactants, in the presence of radical initiators or under the influence of electromagnetic waves at temperatures of −20° to +100° C, and said copolymers are optionally hydrolysed partially or completely.

2. Copolymers according to claim 1 which contain per molecule on average 6 to 150 units of the formulae (1), (2) and (3).

3. Copolymers according to claim 1 which have an average molecular weight of 600 to 15,000.

4. Copolymers according to claim 1 which have an average molecular weight of 600 to 5000.

5. Copolymers according to claim 1, wherein R in the formula (3) is alkyl of 2 to 18 carbon atoms.

6. Copolymers according to claim 5, wherein R is alkyl of 2 to 8 carbon atoms.

7. Copolymers according to claim 6, wherein the recurring unit of the formula (3) is derived from n-butyl vinyl ether.

8. In a detergent composition containing an anionic, amphoteric or non-ionic detergent surfactant and a builder, the improvement wherein the builder includes at least one copolymer according to claim 1.

9. In a method of washing a textile material with a detergent composition containing an anionic, amphoteric or non-ionic surfactant and a builder, the improvement comprising the use of the detergent composition according to claim 8.

* * * * *